No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 1.

Fig. 1.

WITNESSES:
W. R. Edelin.
Amos W Hart

INVENTOR
James W. Taylor.
BY Munn & Co.
ATTORNEYS

No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 2.

INVENTOR
James W. Taylor
BY Munn & Co.
ATTORNEYS

Witnesses
H. R. Edelin
Amos W. Hart

No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 3.

WITNESSES:
W. R. Edelen
Amos W Hart

INVENTOR
James W. Taylor.
BY
ATTORNEYS

No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 4.

WITNESSES:

INVENTOR
James W. Taylor
BY
ATTORNEYS

No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 5.

WITNESSES:
W. R. Edelen
Amos W. Hart

INVENTOR
James W. Taylor
BY Munn & Co.
ATTORNEYS

No. 698,420. Patented Apr. 22, 1902.
J. W. TAYLOR.
MACHINE FOR APPLYING GATHERING STRINGS TO BAGS.
(Application filed Apr. 4, 1901.)

(No Model.) 9 Sheets—Sheet 6.

WITNESSES:
W. R. Edelen.
Amos H. Hart.

INVENTOR
James W. Taylor.
BY Munn & Co.
ATTORNEYS

No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 7.

WITNESSES:
INVENTOR
James W. Taylor.
BY
ATTORNEYS

No. 698,420. Patented Apr. 22, 1902.
J. W. TAYLOR.
MACHINE FOR APPLYING GATHERING STRINGS TO BAGS.
(Application filed Apr. 4, 1901.)
(No Model.) 9 Sheets—Sheet 8.

WITNESSES:

INVENTOR
James W. Taylor.
BY
ATTORNEYS

UNITED STATES PATENT OFFICE.

JAMES W. TAYLOR, OF GOLDSBORO, NORTH CAROLINA, ASSIGNOR OF THREE-FOURTHS TO GEORGE ALEXANDER NORWOOD, JR., THOMAS HALL HOLMES, AND JOHN SPICER, OF GOLDSBORO, NORTH CAROLINA.

MACHINE FOR APPLYING GATHERING-STRINGS TO BAGS.

SPECIFICATION forming part of Letters Patent No. 698,420, dated April 22, 1902.

Application filed April 4, 1901. Serial No. 54,371. (No model.)

*To all whom it may concern:*

Be it known that I, JAMES W. TAYLOR, a citizen of the United States, residing at Goldsboro, in the county of Wayne and State of North Carolina, have made certain new and useful Improvements in Machines for Applying Gathering-Strings to Bags, of which the following is a specification.

Bags for holding various substances, especially smoking-tobacco, are commonly provided with gathering or shirring strings for closing their mouths. Two such strings are inserted in the opposite hems or folds formed at the mouth of the bags, and their free or loose ends are knotted to prevent accidental detachment of the strings. By pulling such knotted ends the mouth of a bag is puckered or drawn together, so as to effectually prevent escape of the contents under ordinary conditions. Such strings have usually been inserted by hand, although machines have also been employed with some measure of success.

It is the object of my invention to entirely dispense with hand labor for this purpose and to provide an improved automatic machine which will do the work in a quicker, cheaper, and uniform manner.

The machine includes many novel features of construction, arrangement, and operation of parts, as hereinafter set forth, and illustrated in the accompanying drawings, in which—

The chief operations of my machine consist, first, in placing bags upon vertical pins which support them and stretch their mouths during the subsequent operations; second, drawing off string from a spool or other source of supply and severing a portion or length thereof suitable for one of the strings proper; third, threading or stringing the needles; fourth, inserting the strings in the hems of the bags; fifth, releasing tension on the mouths of the bags and allowing the latter to discharge from the machine.

The frame A A' of the machine is made duplex or double (see Fig. 3) in order to support two complete bag-stringing mechanisms, which are operated from a single drive-shaft B, arranged intermediately of the two duplex portions of the frame. The following description will relate chiefly to one of the two duplicate mechanisms, and a description of the same will answer in general for the other.

Figure 4:
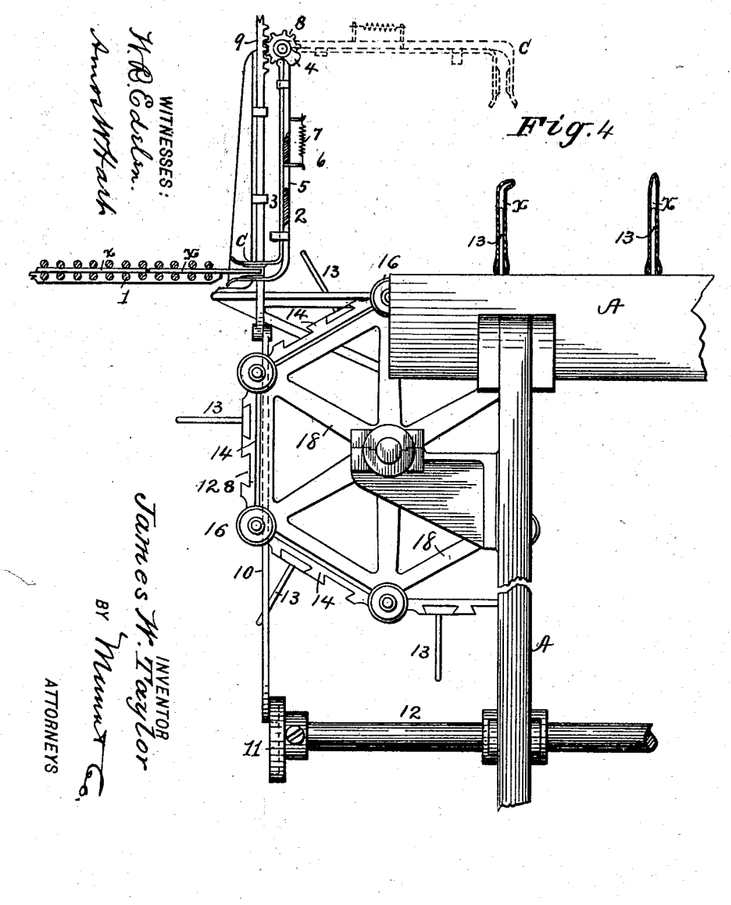
Fig. 4, Sheet 4, is in part a side elevation and in part a section of one end of the machine, particularly illustrating the mechanism for placing the bags upon the pins which hold them during the subsequent operation of stringing.

As shown in Fig. 4, the bags $x$ received from a sewing-machine (not shown) are delivered to this machine by means of parallel rollers 1 and by means of a swinging clamp C are seized, raised to a vertical position, and then dropped upon the holding and stretching pins 13 $13^a$. Such swinging clamp consists of a fixed bar 2 and a movable bar 3, a fixed cam 4, and means for swinging the clamp, as will be presently described. The main portion of the clamp consists of a bar 2, whose lower end is bent laterally, and the sliding bar 3 has a similar bent portion, thereby forming opposite jaws, which are provided with rubber pads on their inner sides to adapt them to seize and hold a bag $x$. The bar 2 is provided with a slot 5, through which projects a stud 6 from the sliding bar 3. A spring 7 is applied to the stud 6 and connected with a similar stud on the bar 2 for the purpose of holding the slidable bar 3 in such position that its jaw is normally separated from the fixed bar 2. The bar 2 is keyed upon a shaft provided with a pinion 8, and when said shaft is rotated the clamp begins to move to the right, as in Fig. 4, whereby the upper end of the slidable rod, comes in contact with the fixed bar 4, and the jaws are thereby closed upon the bag. The swinging movement being continued until the bag-clamp reaches the position shown by dotted lines in Fig. 4, the slidable bar slips off the cam 4, and the jaws being thereby opened the bag is released and falls upon the guide and stretching pins 13 $13^a$. The means for operating the swinging bag-clamp C is a rack-bar 9, arranged vertically in suitable guides and connected with a pitman 10, which is operated to reciprocate the rack-bar 9 vertically by means of cam 11, fixed on the rotary shaft 12. The latter is suitably geared with the driving-shaft B. It is apparent that the bag-clamp is operated—that is, caused to seize a bag and swing to a horizontal position and then return to place—at each revolution of the cam 11, the clamping action and the release of the bag being in both cases automatically performed.

Figure 1:
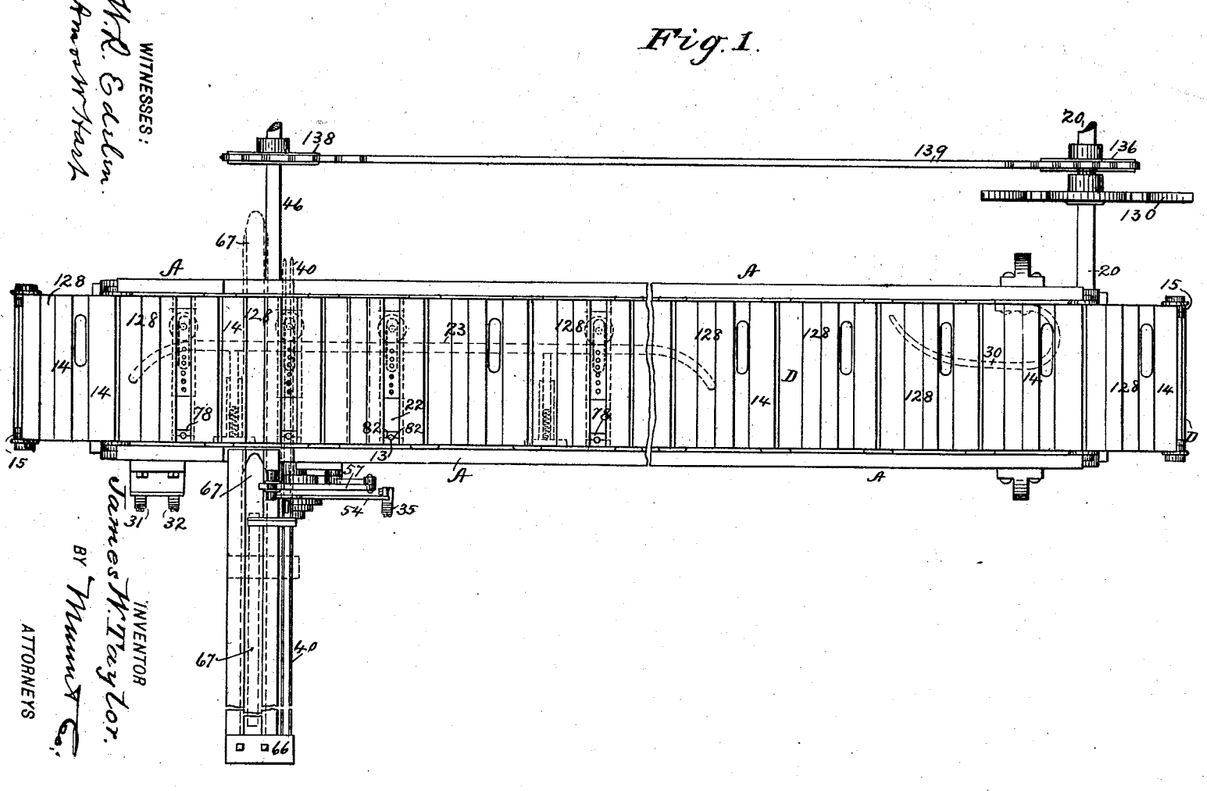
Figure 1 is a plan view of a main portion of the machine.
Figure 5:
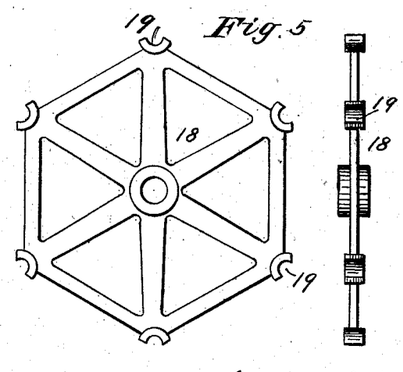
Fig. 5 includes a side view and an edge view of one of the sprocket-wheels upon which the endless bag-carrier is supported and travels.
Figure 7:
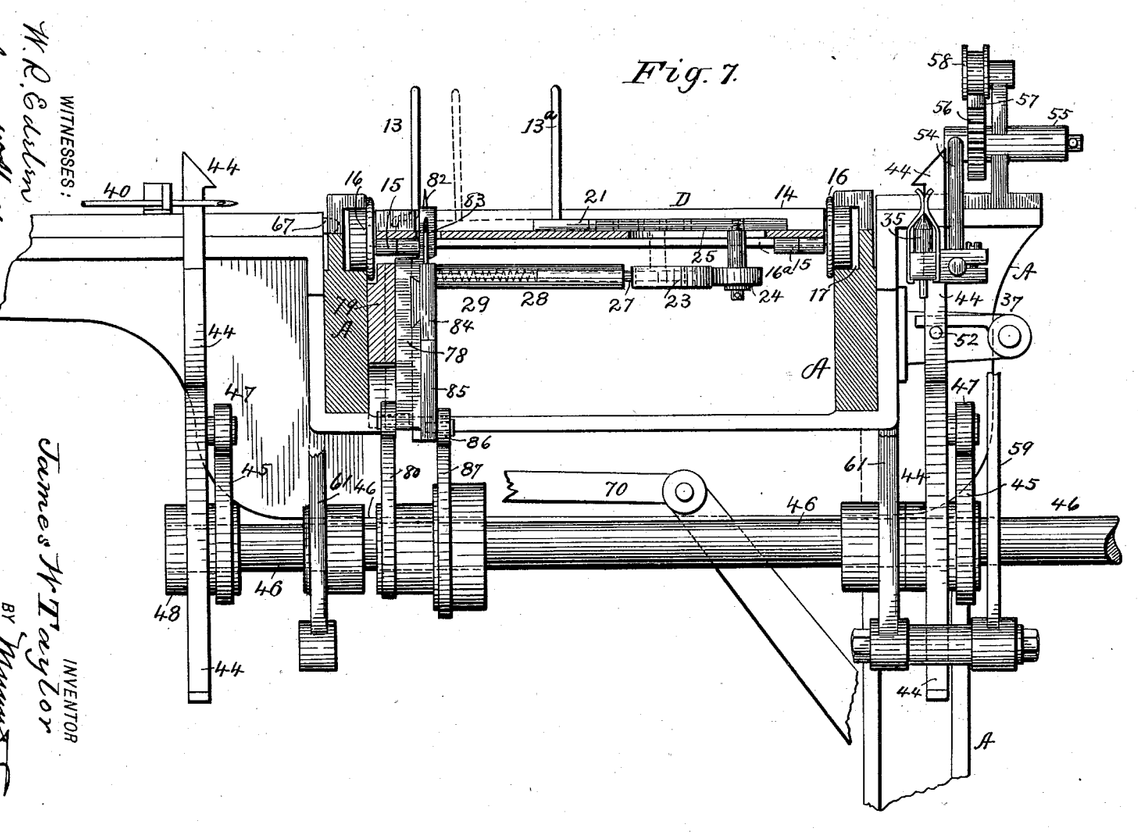
Fig. 7, Sheet 5, is a vertical enlarged cross-section of the machine, certain parts being omitted.

Each pair of pins 13 $13^a$ is attached to and carried by an endless traveling belt D, which is formed of a series of rigid metal plates 14, connected by joints or hinges 15. (See Figs. 3 and 7.) This endless carrier D is supported by flanged wheels 16, which run in slotted guideways 17 in the upper portion of the frame A, and on rails $17^a$, arranged horizontally in the lower portion of the frame. (See Fig. 2.) The wheels 16 are mounted upon axles $16^a$. (See Figs. 7 and 8.) Stub-axles might, however, be employed with equal facility. The axles pass through alined lugs formed at the adjacent ends of carrier plates or sections 14. At the ends of the machine—that is to say, of the frame A—the endless carrier D passes around and is duly supported by two vertical sprocket-wheels 18, which are shown in detail in Fig. 5. The said wheels are hexagonal and provided at the apexes of their angles with sockets or semicircular grooves 19 for receiving the axles of the wheels 16. Each pair of sprocket-wheels 18 is supported by a shaft 20, arranged transversely in suitable bearings provided with brackets 21, attached to the end portions of the frame proper, A. One of the pins 13 is fixed in plates or sections 14, comprising the body of the endless carrier, and the other pin $13^a$ is movable laterally with relation to the first for the purpose of duly stretching a bag after being placed thereon. For this purpose each movable pin $13^a$ is fixed in a block 21, adapted to slide in one of the dovetail grooves 22, formed in each of the plates or sections of the endless carrier D. When the bags have been dropped upon a pair of pins 13 $13^a$ at the left-hand end of the machine, the endless carrier D is moved, whereby the pin $13^a$ is moved laterally and distended sufficiently to stretch the mouth of the bag to the required degree. This movement is effected chiefly by a fixed cam 23, (see dotted lines, Fig. 1, and full lines, Fig. 7,) which acts upon an antifriction-roller 24, mounted upon a stud 25, pendent from the sliding block 21. Said stud projects down through the lengthwise slot 26, formed in each carrier plate or section 14. The cam 23 is supported in horizontal position by means of rods or pins 27, (see Fig. 7,) that work in guides 28, projecting from a side bar of the frame A. Spiral springs 29 are arranged behind the pins 27 in sockets in the bars 28 and serve to force the cam 23 outward to the required degree. The ends of the cam 23 are suitably curved, as shown in Fig. 1, to adapt the wheels 24 to pass easily into and out of engagement with it. In some cases the bags may differ in size, and to provide for this a series of holes may be formed in the sliding block 21 to receive the pin 13ª.

It may be remarked here that the bags are held stretched by the movement of the pin 13ª until the entire operation of stretching and knotting is completed, and to then cause a positive movement of the pin 13ª toward the fixed pin 13 for releasing tension on the bags I provide a spring-cam 30, (see dotted lines, Fig. 1,) which is a bar curved reversely and attached to the side of the frame A and suitably arranged horizontally beneath the top portion of the endless carrier D, so as to strike upon the wheel 24, attached to the slide 21, and thereby force the latter laterally in its groove to the position required for the pins to receive another bag when carried around to the opposite end of the machine.

The means for drawing off thread from a spool or other suitable source of supply and severing a portion of such length thereof as is required to form a bag-string are as follows:

Referring especially to Figs. 1 and 14, 31 and 32 indicate two spring-clamps which are fixed vertically upon a bracket on the side of the frame A and alined in a plane parallel thereto. These clamps are formed of plate-springs, which are bent outward or flared at their upper ends. The clamp 32 is shown in detail in Fig. 15 and provided with two cutters 33, which are attached opposite each other near the upper ends of the clamp, as shown. These cutters 33 are enlarged at their bases, so that their edges cross, and are thereby adapted to make shear cut. Each of the jaws of the clamp is provided with a rubber block or facing 34. A third or swinging clamp 35 is arranged to move vertically in the arc of a circle and to pass down between the fixed clamps 31 32. If now it be supposed that a string $y$ from a spool or other source of supply has been already drawn between the fixed clamps 31 32 and is held by friction with the rubber blocks 34, it will be apparent that when the clamp 35 is swung over, as shown by dotted lines, Fig. 2, its jaws will pass over and seize the string thus held stretched between the clamps 31 32. It is further apparent that if at this moment the clamps 31 32 be released or opened the swinging clamp 35 may take the string with it and, swinging back to the horizontal position shown in Fig. 14, will draw the string off from the spool and also down between the jaws of the clamps 31 32, as indicated by the dotted lines. In this position the string is in readiness to be operated upon and pulled down into the eyes of the needles, as will be presently described.

The means for opening or releasing the clamps 31 32, as above stated, are as follows: The conical pin 36 (see Fig. 13) is arranged between each of the spring-jaws and its pointed end engages their inwardly-inclined portions. If now this pin 36 be forced upward, it is apparent the jaws will be opened. Such movement is effected by tappets 37, which are fixed on and project horizontally from a rock-shaft 38, held in suitable bearings at the side of the machine. These tappets 37 project beneath the reduced shanks 36ª of the conical pins 36, which work in suitable guides at the base of the clamps 31 32. It is apparent that if the shaft 38 be rocked the tappets 37 will force the pins 36 upward, and thereby release the pins. The swinging string-clamp 35 is opened by reason of its pin 36 striking upon a lateral shelf or bracket 39, attached to the side of the machine.

Figure 8:
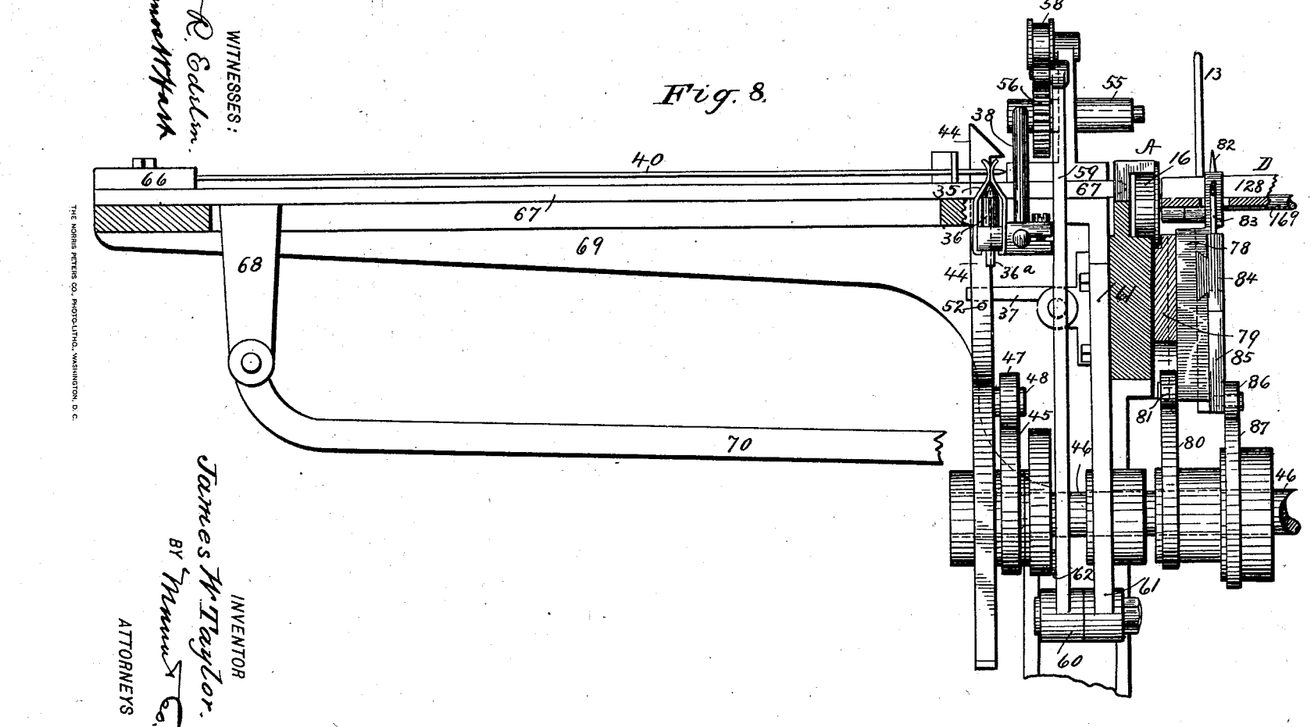
Fig. 8, Sheet 6, is a vertical enlarged section of a portion of the machine, particularly illustrating the arrangement of the needles employed for stringing the bag.
Figures 9, 10, 11, 12, 13:
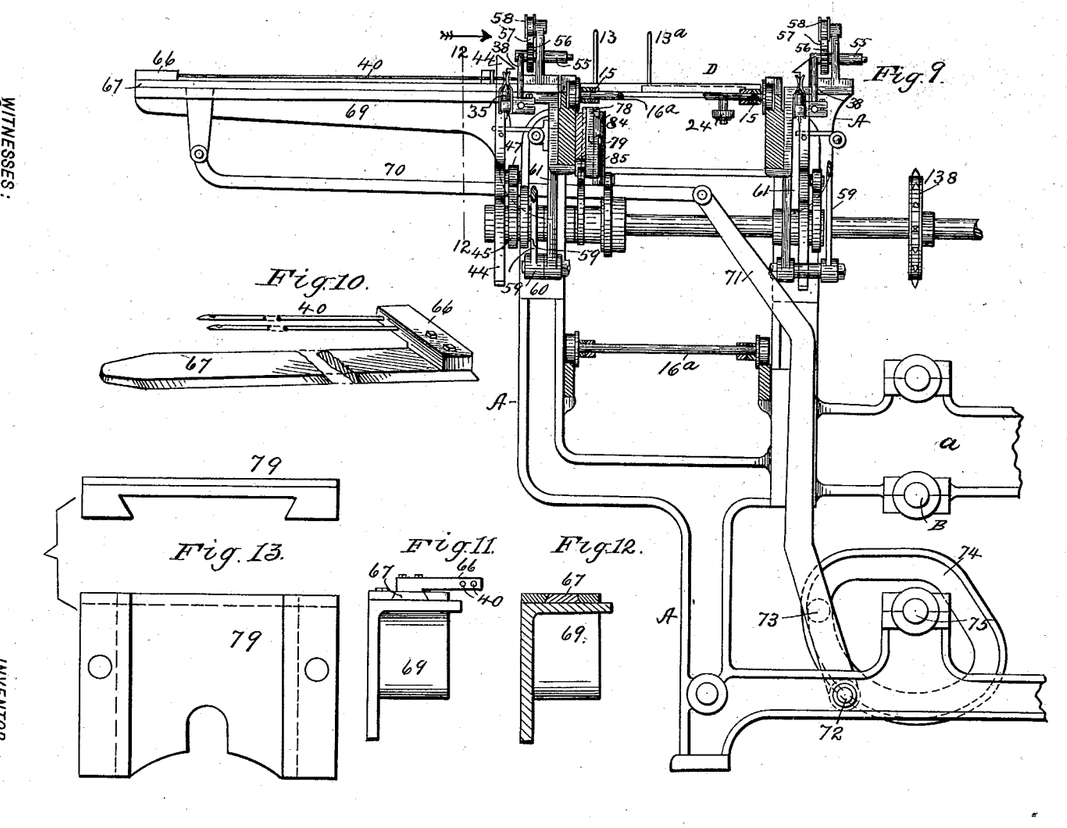
Fig. 9, Sheet 7, is another enlarged vertical transverse section, further illustrating the bag-stringing mechanism and means for operating it.
Fig. 10 is a perspective view of the needles and the slidable bar employed for locking the endless traveling carrier intermittently.
Fig. 11 is a reduced end view of the parts shown in Fig. 10 and including the fixed bracket in which the locking-bar slides.
Fig. 12 is a vertical cross-section of the part shown in Fig. 11.
Fig. 13 includes a top view and a face view of a guide-plate for the sliding block carrying the pointed pins by which the hems of the bag are distended to receive the stringing-needles.
Figures 14, 15:
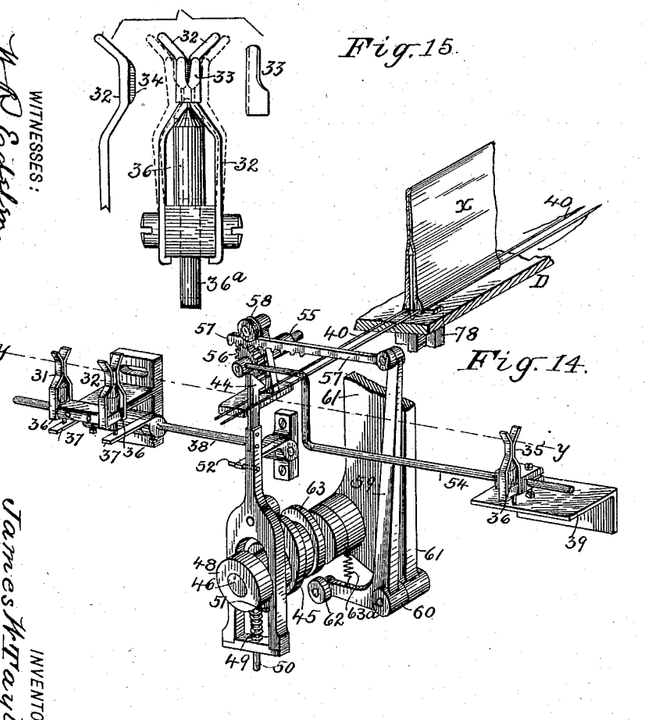
Fig. 14, Sheet 8, is a perspective view illustrating the mechanism for drawing off a bag-string from a suitable source of supply and severing the same to thread a bag.
Fig. 15 includes detail views of one of the spring-clamps and the cutters for holding and severing the bag-string.
Figure 16:
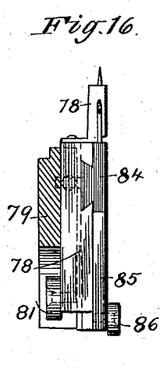
Fig. 16 is a detail vertical section on the lines 16 16 of Fig. 17, illustrating the parts employed for distending the hems of a bag.
Figures 20, 21, 22, 23, 24, 25, 26, 27, 28:
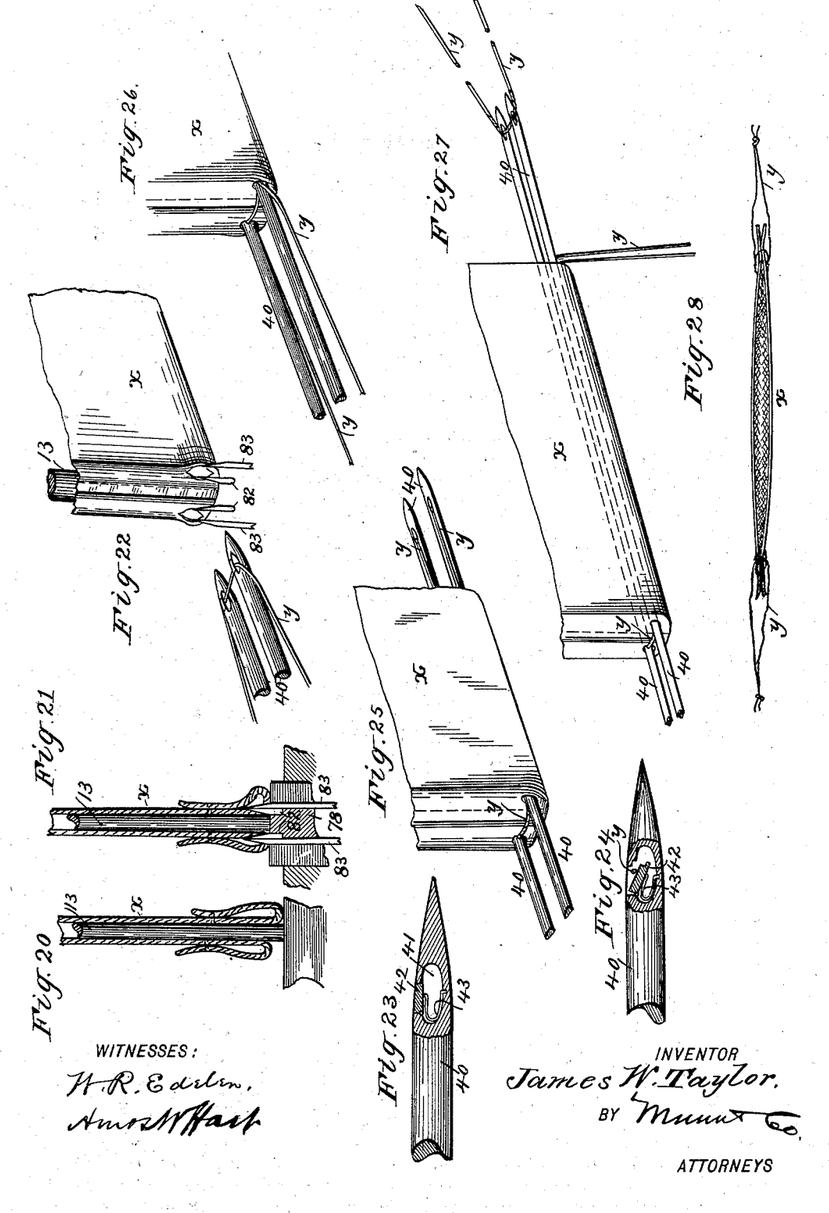
Fig. 20, Sheet 9, is a sectional detail view showing a bag in the position it usually assumes when first applied to the pins which support and distend it.
Fig. 21 is a similar view illustrating the operation by which the hems of the bag are supported horizontally in the same plane preparatory to entrance of the pins for distending said hems.
Fig. 22 is a perspective view illustrating the distention of the bag-hems preparatory to entrance of the stringing-needles.
Fig. 23 is a partly sectional view of the enlarged point of one of the bag-stringing needles.
Fig. 24 is a similar view illustrating the passage of a string into the eye of a needle.
Fig. 25 is a perspective view showing the needles inserted through the hems of a bag and applying one of the strings thereto.
Fig. 26 is another perspective view further illustrating the bag-stringing operation.
Fig. 27 shows the needles threaded and ready to return through the hems of a bag to draw in the second string.
Fig. 28 is a top or edge view of a bag provided with knotted strings.

To adapt the needles 40, which are arranged parallel, as shown, to receive the string $y$, they must be retracted in the position shown in Figs. 1, 8, and 9. As shown in Figs. 23 and 24, the needles are provided with an eye 41, which is open at one side and provided with a latch 42, supported by a string 43. It is apparent that if the string $y$ be pressed downward upon the latch 42 it will pass into the eye, as indicated in Fig. 24. This engagement is effected chiefly by means of the hook 44, (see Fig. 14,) which is adapted to reciprocate vertically between the two needles, as shown. In the operation of drawing off a length of string $y$, as before described, the string strikes upon the inclined or beveled portion of the hook 44 and slides over the nose of the same into position beneath the latter and between it and the needles. If now the hook descends, it will exert traction upon the string $y$, and the clamps 31, 32, and 35 not being yet released the string will have sufficient tension to enable the hook to draw it into the eyes of the needles. The instant this is done, however, the clamps 31, 32, and 35 are opened to release the string. The needles are now in readiness to advance to carry the strings through the hems of the bag. The hook 44 is raised (see Figs. 8 and 14) by means of a cam 45, mounted upon a shaft 46 and acting upon an antifriction-roller 47, mounted upon a stub-journal 48, projecting from the inner side of the hook 44. The lower portion of the hook 44—to wit, its shank—is broadened and enlarged and provided with a lengthwise slot and adapted to embrace a reduced portion of the shaft 46. A collar 48 is applied to the outer end of said shaft to serve as a guide for the hook in its vertical movement. While the hook 44 is raised by means of the cam 45, as above stated, it is retracted by a spiral spring 49, which encircles a pin 50, that works in a yoke or cross-bar at the lower end of the hook 44. The upper end of the spring 49 acts against a block 51, which is cut out on its upper side to adapt it to work in contact with the shaft 46. The hook 44 is provided with a laterally-projecting pin 52, which passes under the free outer end of a lever-arm 53, and the latter is fixed upon the rock-shaft 38, which operates the tappets 37. It is thus apparent that the hook 44 performs two functions in that as it rises it acts upon the lever-arm 53 to rock the shaft 38 and cause release of the string-clamps 31 32, and, secondly, in its reverse or downward movement the hook strings the needles, as before described.

Figure 2:
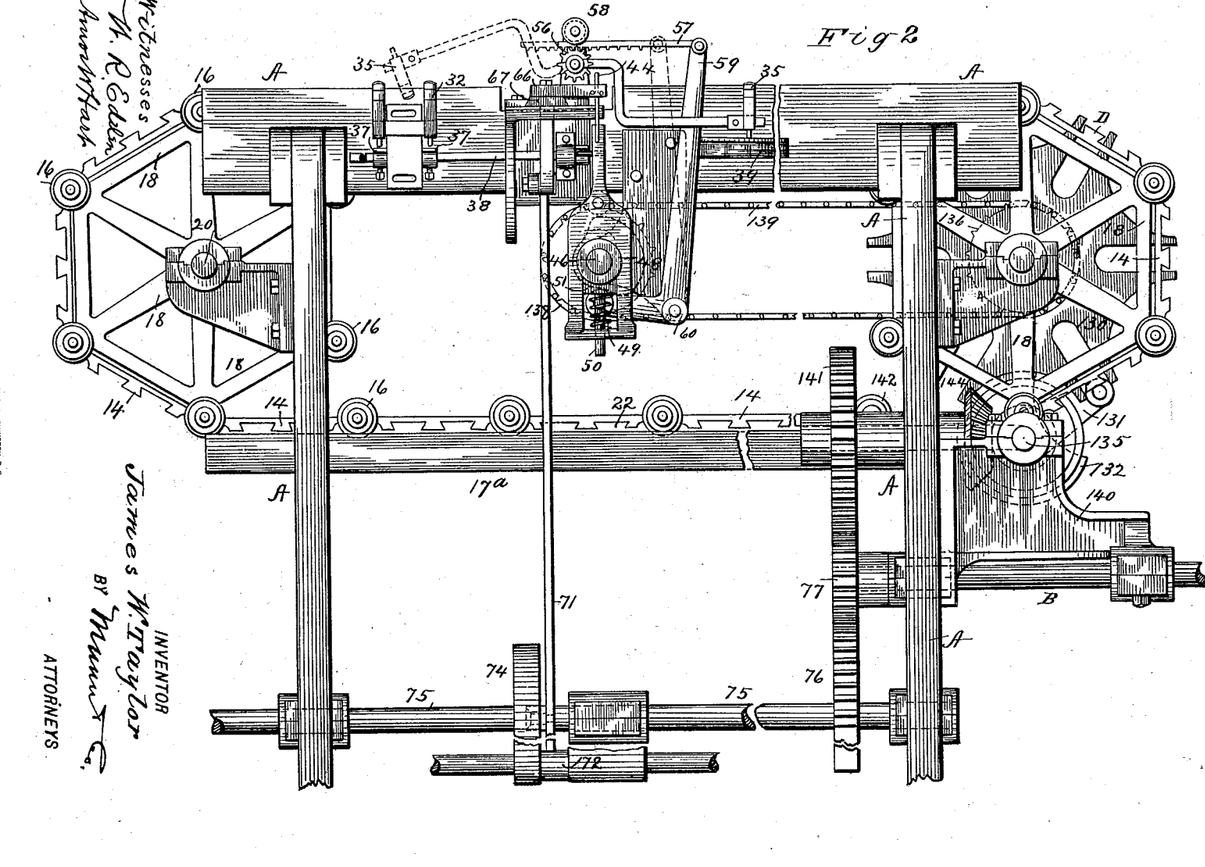
Fig. 2, Sheet 2, is a side elevation.

The means for operating—that is, swinging—the string-clamp 35 are the following: The rod 54, carrying the said clamp, is fixed in a collar held on the rock-shaft 55, upon which is also keyed a pinion 56. A rack-bar 57 is held engaged with this pinion by means of a grooved collar 58 and is pivoted to the upper end of an elbow-lever 59, fulcrumed at 60 on a fixed portion 61 of the machine. The shorter arm of said lever 59 carries an antifriction-roller 62, which is in position to engage a cam 63, fixed on the shaft 46, adjacent to the cam 45, which operates the hook 44. It will be seen that upon rotation of the shaft 46 the elbow-lever 59 will be oscillated and the rack-bar 57 thereby caused to rotate the pinion 56 and throw the swinging clamp 35 over into the position shown by dotted lines, Fig. 2, and that the reverse movement will be effected by a spring 63$^a$. The shaft 46 derives rotation from one of the shafts carrying the sprocket-wheels 18, as shown in Figs. 1 and 2, through the medium of sprocket-wheels 138 and sprocket-chain 139.

Figure 17:
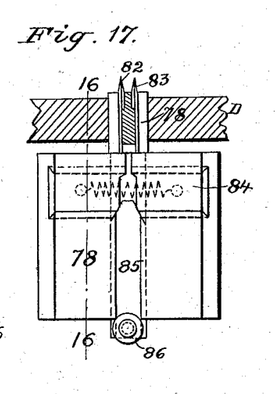
Fig. 17 is a face view, part being in section, of the parts shown in Fig. 16.
Figure 18:
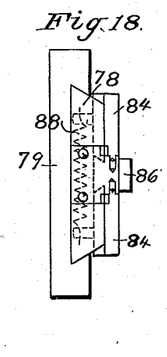
Fig. 18 is a plan view of the parts shown in Fig. 16.
Figure 19:
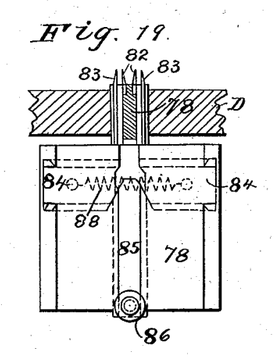
Fig. 19 is a view similar to Fig. 17 save that it illustrates the operation of the parts.

As shown in Fig. 10, the two needles 40 are fixed in a suitable head or cross-bar 66, to which a bar 67 is also secured. This bar 67 serves as one of the means for locking the bag-carrier D, as will be hereinafter described. An arm 68 (see Figs. 8 and 9) is pendent from this locking-bar 67, which slides in a dovetail groove in a lateral bracket or arm 69, projecting from the machine, as indicated in Fig. 1. The arm 68 projects down through and moves in a lengthwise slot formed in the lateral bracket 69. A link or pitman 70 connects the pendent arm 68 with an obtuse-angled lever 71, which is pivoted (see also Fig. 2) on a rod 72 at the lower portion of the frame A and is provided with a wrist-pin 73, working in the groove of a cam 74, which is keyed upon the shaft 75 and derives motion from the drive-shaft B through the medium of a gear 76, that meshes with a smaller gear 77, mounted upon said drive-shaft. By the revolution of the cam 74 the lever 71 is oscillated to cause retraction and dwell of the locking-bar 76 and the needles 40, as required. Preparatory to passage of the needles 40 with strings applied thereto, as already described, through the hems of the bags $x$ it is necessary that the said hems be in due position and that they also be distended. It is found in practice that most of the bags are of unequal length on the opposite sides—that is to say, that the hems formed at the mouth on the opposite sides are not exactly even or not the same distance from the bottom of the bag, as illustrated in Fig. 20. It is necessary that the hems shall be in the same horizontal plane prior to the introduction of the needles. This is effected by pressure from below, which is applied to that hem which projects lowest by means of a vertically slidable block 78. (See Fig. 21.) This block is adapted to slide vertically in a dovetail groove formed in a plate or block 79, (see Fig. 13,) fixed on the side of the frame A. As shown in Fig. 8, the block 78 projects upward through a slot in a section or plate 14 of the carrier D and is raised by means of a cam 80, fixed on the rotary shaft 46, and acts upon an antifriction-roller 81, attached to the lower end of said block. This cam 80 thus serves to raise the block 78 each time that a bag comes into position to be threaded, and the hem that projects lowest will be thereby raised and flattened, as shown in Fig. 21. In addition to thus evening the mouth of the bag it is requisite to distend the mouths of the hems at the ends of the needles 40. This operation is effected by means of separable points 82 83, constructed in a peculiar manner. The points 82, which are shortest, are fixed in position in the block 78, but the points 83 are movable laterally or outward from the points 82 in order to distend the hem, as shown in Fig. 22. As shown in Fig. 21, the two pins of each pair are so beveled as to form a common conical point adapted to enter a hem of the bag, and when the block 78 is forced upward, as before described, the two pairs of conical points enter the hems as shown in Fig. 1. The next step is the lateral movement of the points 83, which distends the hems. In Fig. 17 the two pairs of points 82 83 are shown together, as when they enter the hems of the bags. In Figs. 18 and 19 they are shown separated as required to distend the hems of the bags, as shown in Fig. 2. To effect this, the points 83 are fixed to laterally-slidable blocks 84. The latter are arranged in a horizontal dovetail groove formed in the vertically-slidable block 78, and their inner adjacent ends are beveled at the lower edge to provide for entrance of a wedge 85 between them. The said wedge is adapted to slide vertically in a groove in the central portion of the block 78 and provided at its lower end with an antifriction-roller 86, which works in contact with a cam 87, fixed on the rotary shaft 47. (See Fig. 8.) The slidable blocks 84 are held normally retracted or drawn together by means of a spiral spring 88 (shown in dotted lines, Figs. 17, 18, and 19) and arranged in suitable cavities in the block 78. To recapitulate, the cam 80 raises the block 78, and thereby the points 82 83 are forced upward into the hems of a bag, whereupon the cam 87 comes into action and forces the wedge 85 between the sliding blocks 84 and forces them asunder a distance sufficient for the proper distention of the bag-hems. The needles 40 then advance and enter the hems, and in the remainder of their passage through the latter they are suitably guided and pass out at the other end of the hems, thus carrying one of the puckering-strings $y$ entirely through the hems, as illustrated in Figs. 25 and 27. When the needles pass the due distance beyond the bag on the opposite side from their points of entrance, they receive another string, which is applied by mechanism similar to that already described, and therefore requires no specific description nor full illustration. Said mechanism is, however, illustrated in part in Figs. 7 and 9. The needles 40 are then retracted, and thus carry a second string $y$ through the hems of the bag and leave the free ends of the same projecting on the side from which the needles first entered—that is, a bag is provided with two strings whose ends project on opposite sides. The next step in the operation is knotting the ends of the string $y$ thus applied to the bag.

I will now describe the means for moving and locking the endless carrier D.

Figure 6:
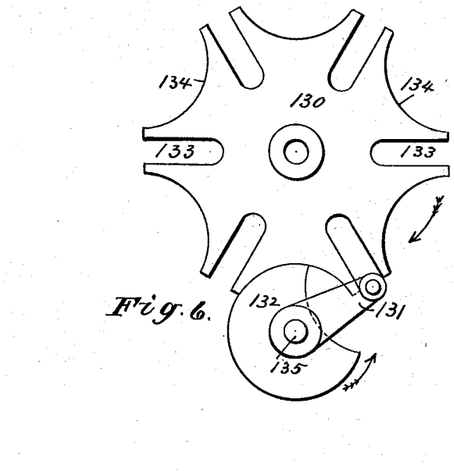
Fig. 6 is a side view of an escapement and locking mechanism for the endless carrier.

The locking-bar 67 (see Fig. 9) has been before referred to. It is conical or wedge-shaped at its outer end and is adapted to slide into one of the dovetail grooves 128. (See Figs. 1 and 4.) One of such grooves comes directly opposite the locking-bar 67 when a pair of bag-holding pins 13 13ª are in proper horizontal alinement with the needles 40. This position is shown in Fig. 1, in which the dotted lines also indicate the extent to which the bar 67 projects from the opposite side of the carrier D when forced inward for locking the latter. As shown in Figs. 11 and 12, the locking-bar 67 is guided laterally in the dovetail groove in bracket 69, (see also Figs. 8 and 9,) affixed to the side of the machine. A further means for locking the carrier D is combined with the means for intermittently moving it. The said means consist of an escapement-wheel 130 (see Fig. 6) and crank-arm 131 and a multilated or cut-out disk 132. The escapement 130 is a plate having a series of open slots 133 in its periphery and a series of intervening arcs 134. The crank-arm 131 is keyed upon a transverse shaft 135, which is arranged in suitable bearings in the two frames A and A'. (See Fig. 3.) The crank-arm carries an antifriction-roller on its wrist-pin, which is adapted to work in the radial slots 133 of the escapement 130. The shaft 135 is constantly rotated, and it will be seen that the escapement 130 must therefore receive an intermittent rotary motion. The escapement is keyed upon one of the shafts 20, (see Fig. 3,) carrying the sprocket-wheels 18, upon which the two endless carriers D are supported and rotated at one end of the frame. The disk 135 is adapted to fit and work in the arcs 134 of the escapement 130, so that while the wrist-pin of the crank is free from the radial slots 133 the escapement 130 is movable or unlocked. Thus the escapement serves for moving the carriers D the required distance intermittently and is locked by the disk 132 during the time that a bag is being applied to the pins 13 13ª and another bag is being duly strung and the strings of another are being knotted. In other words, the several operations of placing the several bags upon the pins, of drawing off strings from a spool or other source of supply, the stringing of the bags, and the tying of the knots are all performed practically simultaneously, and then the endless carrier D is moved a distance required to advance the bags one step—that is, the distance between the apexes 19 of the sprocket-wheels 18 (see Fig. 5) or the width of one of the hinge plates or sections 14, composing the endless carrier D. The escapement 130 locks the carrier as to general movement, while the locking-bar 67 holds the particular section 14 carrying the bag upon which the needles act perfectly rigid or immovable. The two parts 130 and 67 are therefore complementary, and yet each performs a special function. In further explanation of the coaction of the escapement 130 and the locking-disk 132 I will state that the projecting portions of the escapement of which the slots are formed enter the recess or cut-out portion of the disk 132, so that the said projections readily pass by the said disk, as shown in Fig. 1. A sprocket-wheel 136 is keyed upon the shaft 20, carrying the escapement 130, and a similar sprocket-wheel 137 is keyed upon the shaft 108, and a third and similar sprocket-wheel 138 is keyed upon the shaft 46. These three shafts 20, 108, and 46 serve to operate both sets of bag-stringing mechanisms. A sprocket-chain 139 runs on these several sprockets, passing around the end sprockets 136 and 138 and above and below the central sprocket 137, with which it will be held duly engaged by some form of belt-tightener. Thus the three shafts above mentioned are all rotated together at the same speed. The shaft 135, carrying the locking-disk 132 and the crank-arm 131, (see Figs. 2, 3, and 6,) is suitably supported and journaled in brackets 140, fixed to the ends of the frame A, and in which the driving-shaft B is also journaled, as shown in Fig. 2. The gear 77, fixed on the inner end of the drive-shaft B, meshes with a larger gear 141, (see Figs. 2 and 3,) which is fixed upon the shaft 142, carrying a bevel-gear 144, that meshes with a similar gear on the shaft 135, and thus rotation of the drive-shaft B is communicated to the shaft 135, and thereby to the escapement 130 and the bag-carrier D, as before described.

Figure 3:
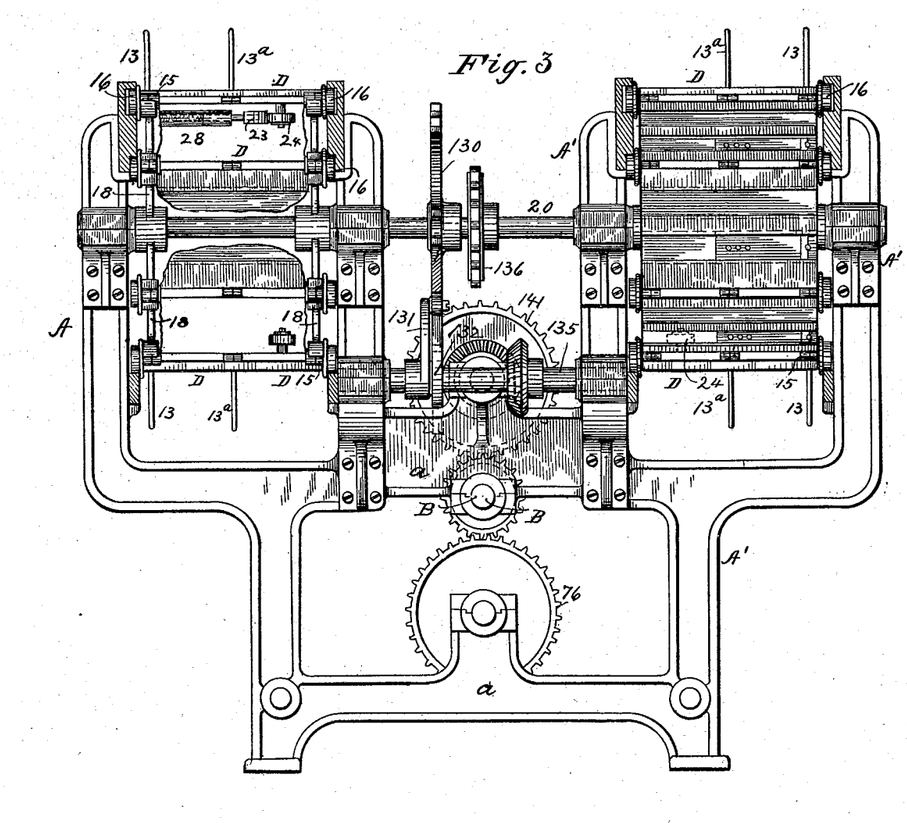
Fig. 3, Sheet 3, is an end elevation.

As shown in Fig. 3, the two duplicate parts A A' of the frame are connected and formed integrally with cross bars or webs $a$, and the latter serve as means for supporting a portion of the shafting. Thus two complete bag-stringing mechanisms are operated by the same driver and connected shafting and gears.

What I claim is—

1. In a machine of the character described, the combination of a bag-clamping device, and a shaft with which it is adapted to swing, of a pinion keyed upon the pivot-shaft, a cam fixed in position relatively to said pinion, a vertically-slidable rack-bar engaging the said pinion, a rotary propelling medium, and means connecting the latter with the said rack-bar, whereby the bag-clamp is swung into vertical position and closed and opened, substantially as shown and described.

2. In a machine of the character described, the combination with a swinging bar having one end constructed as a horizontal jaw, of a movable bar adapted to slide on the swinging bar and having a corresponding jaw, a spring for retracting the movable bar whereby the jaws are held normally opened, means for swinging the bag-clamp as described, and a fixed cam arranged as described and adapted to engage the sliding bar for closing the jaws upon a bag.

3. In a machine of the character described, the combination with an endless traveling bag-carrier composed of a series of plates or sections jointed together, of a supporting-frame and rotatable means arranged at the ends thereof for supporting the carrier as specified, and bag supporting and stretching devices affixed to said sections, one of said devices being movable toward and from the other, and means for shifting such device, substantially as shown and described.

4. In a machine of the character described, the combination of a movable bag-carrier proper, of bag supporting and stretching pins arranged vertically, one of said pins being movable toward and from the other, and means for automatically shifting the movable pin for stretching and then releasing a bag, substantially as shown and described.

5. In a machine of the character described, the combination with a movable bag-carrier having pins for holding and stretching bags as specified, one of said pins being movable toward and from the other, a cam arranged horizontally and parallel to the carrier, and means connected with the movable pin for engaging said cam, whereby, as the carrier advances, the movable pin is shifted to stretch a bag, substantially as shown and described.

6. In a machine of the character described, the combination with an endless traveling bag-carrier comprising a series of plates or sections jointed together, a series of pairs of pins carried by the several sections, one of the same being movable toward and from the other, a cam arranged beneath the carrier and adapted to yield to pressure as specified, and movable pins having pendent portions adapted to engage the cam, substantially as shown and described.

7. In a machine of the character described, the combination with a suitable supporting-frame, of an endless bag-carrier having a series of plates jointed together, bag holding and stretching pins applied to such plates or sections, one of said pins being movable and held in a block adapted to slide transversely of a section, an arm or stud pendent from such sliding block, and a cam arranged beneath the carrier and adapted to engage such stud or arm, substantially as shown and described.

8. In a machine of the character described, the combination with a suitable supporting-frame, of an endless traveling bag-carrier comprising plates or sections jointed together and having a transverse dovetail groove, a fixed pin arranged on such section, a block adapted to slide in the aforesaid groove and having a vertical pin and a pendent arm or stud projecting through a transverse slot in the section, a cam arranged horizontally beneath the carrier and having rounded or bent ends, horizontal guides attached to the frame, and projecting toward the cam, supports for said cam which are adapted to slide in said guides, and springs for pushing the cam laterally, whereby due tension is applied to the bags while held by the pins, substantially as shown and described.

9. In a machine of the character described, the combination with an endless traveling bag-carrier, of pairs of pins held thereon, one of each pair being movable laterally, means for shifting the movable pin for holding the bag under due tension when required, and a fixed cam adapted to act upon a pendent portion of the movable pins for shifting them toward the fixed pins, to release tension on the bags, substantially as shown and described.

10. In a machine of the character described, the combination with needles adapted to reciprocate horizontally, of a spring-clamp for holding a string, a swinging device adapted to engage the string while so held and draw off a portion of the same, and a vertically-reciprocating device working between the needles and adapted to engage the string while drawn across them and to carry the same down into the eyes of the needles, substantially as shown and described.

11. In a machine of the character described, the combination with needles adapted to reciprocate horizontally, of a spring-clamp for holding the string temporarily, of a cutter affixed to the said clamp below its mouth, a device for drawing off the string from the said clamp and means for pulling the string downward to cause it to engage the cutter and enter the eyes of the needles, substantially as shown and described.

12. In a machine of the character described, the combination with needles adapted to reciprocate horizontally and provided with spring-latches normally closing their eyes, the means for holding a string temporarily, and means for drawing off the same, and a puller adapted to work adjacent to the needles and to engage the string and draw the same down against the pressure of the spring-latches, substantially as shown and described.

13. In a machine of the character described, the combination with needles adapted to reciprocate horizontally, of fixed spring-clamps having flaring jaws and arranged vertically, means for automatically opening the said jaws, and a swinging clamp adapted to pass between the fixed clamps and to engage a string held by the latter, the said swinging clamp being itself provided with means for opening its jaws and releasing the string at the proper juncture, substantially as shown and described.

14. In a machine of the character described, the combination with needles adapted to reciprocate horizontally, of fixed spring-clamps arranged as described, conical pins adapted to move vertically for opening the clamps, means for engaging the lower ends of said pins for the purpose of opening the clamps, and suitable mechanism for drawing off the string and into the eyes of the needles, substantially as shown and described.

15. In a machine of the character described, the combination with needles adapted to reciprocate horizontally and means for placing a thread in the needle, of fixed spring-clamps, conical pins adapted to reciprocate for opening the clamps, tappets arranged below said pins, a rock-shaft whereon the said tappets are keyed, a lever-arm applied to the said rock-shaft, and means for rotating the latter for opening the clamps at the required time, substantially as shown and described.

16. In a machine of the character described, the combination with needles adapted to reciprocate horizontally, of spring-clamps adapted for holding the string temporarily, means for opening the clamps, a swinging device which engages the string for drawing it off and across the needles as specified, and a vertically-movable device adapted to engage the string and for pulling it into the eyes of the needles, and means for connecting the said movable device with the aforesaid means for opening the clamps, substantially as shown and described.

17. In a machine of the character described, the combination with fixed string-clamps, of a swinging clamp composed of spring-jaws and a slidable pin adapted to open the latter, the said pin projecting as specified, and the said clamp being adapted to swing between the fixed clamps for seizing and drawing off the string, and a fixed projection or bracket upon which the swinging clamp strikes when thrown back to its normal position, whereby the string is drawn across the needles and then released, substantially as shown and described.

18. In a machine of the character described, the combination with a clamp for holding a string temporarily, of a device for drawing off the string across the needles, mechanism for operating such device, and means for pulling the string downward into the eyes of the needles while held between the clamps, substantially as shown and described.

19. In a machine of the character described, the combination with needles adapted to reciprocate horizontally, of a fixed string-clamp, a movable clamp for drawing off the string across the needles, a hook adapted to work adjacent to the needles, a cam for raising the said hook at the proper time, and means for operating the said movable clamp, substantially as described.

20. In a machine of the character described, the combination with means for holding and stretching a bag and means for inserting a string, of a vertically-movable block or device adapted for contact with the hems of the bag adjacent to one of the holding devices, whereby said hems are evened or brought into the same horizontal position, for the purpose specified.

21. In a machine of the character described, the combination with a movable bag-carrier having a series of pairs of pins for holding and stretching the bags and needles for inserting strings, of a vertically-movable device adapted to project upward through slots in the carrier and have contact with the hems of the bags adjacent to the pins where the needles enter, whereby the hems of the bags are brought into a like position, substantially as shown and described, for the purpose specified.

22. In a machine of the character described, the combination with needles for inserting string and an endless traveling bag-carrier, comprising a series of plates or sections hinged together and provided with openings and with a series of pairs of pins for holding the bags, of a verticallly-movable block carrying pairs of points or pins, one of each pair being movable laterally, and means for effecting such lateral movement after the said points have entered the hems of the bags, whereby the hems are distended preparatory to the entrance of the needles, substantially as shown and described.

23. In a machine of the character described, the combination with string-carrying needles, a movable bag-carrier and devices for holding the bags thereon, of means for projecting upward through the carrier and engaging the hems of the bags for distending them preparatory to entrance of the stringing-needles, substantially as shown and described.

24. In a machine of the character described, the combination with a traveling bag-carrier and needles for inserting string in bags, of a block adapted for contact with the hems of bags while duly held on the carrier, whereby said hems are evened in a horizontal plane, fixed points projecting from said block, and movable points arranged alongside the same, substantially as shown and described, whereby the bag-hems are evened and pierced for distention simultaneously, as specified.

25. In a machine of the character described, the combination with needles carrying string and the bag-carrier and means for having bags duly stretched thereon, of two pairs of hem-piercing points, each pair being composed of two separate points which are beveled and flattened on their opposite sides as shown, one of the points of each pair being movable laterally, and means for effecting such movement, substantially as shown and described.

26. In a machine of the character described, the combination with a bag-holder and needles for inserting string, of pairs of hem piercing and distending points, one of each pair being movable laterally, a vertically-movable bar by which said points are carried, and laterally-slidable blocks held on the vertically-movable bar and carrying the movable points, and means for automatically separating the sliding blocks, substantially as shown and described.

27. In a machine of the character described, the combination with needles for inserting string, and an endless traveling bag-carrier and pairs of pins supported thereby, of a vertically-movable part carrying pairs of hem-piercing points, one of each pair being movable laterally, slidable blocks arranged horizontally on said movable part, a wedge adapted to enter between such movable blocks for separating them for the purpose of distending the bag-hems, means for raising the movable part and forcing the wedge upward at the right juncture, and means for retracting the movable blocks after the hem has been distended, substantially as shown and described.

28. In a machine of the character described, the combination with needles for inserting string, and an endless traveling bag-carrier having a series of pairs of bag-holding pins, of a vertically-movable part carrying fixed points for piercing the hems of the bags, movable points arranged normally in contact with the fixed ones, laterally-movable blocks carrying the movable pins and sliding in the dovetail ways in said movable part, a wedge arranged vertically in a dovetail way and adapted to force the said movable blocks asunder, and means for operating the said movable part and the wedge in the order specified.

29. In a machine of the character described, the combination with string-inserting devices and an endless traveling bag-carrier having a series of plates or sections hinged together and provided with a socket or groove, of a device adapted for entering such socket or groove for the purpose of locking the individual section, substantially as shown and described.

30. In a machine of the character described, the combination with an endless traveling bag-carrier having a series of plates or sections which are jointed together and provided with pins for duly holding and stretching a bag, and also constructed with a transverse groove or socket, of a locking-bar arranged at the side of the frame horizontally, and adapted to enter such groove or socket, needles arranged adjacent to the locking device, the point of the latter being in advance of those of the needles, whereby said section is locked preparatory to engagement of the needles with a bag, substantially as shown and described.

31. In a machine of the character described, the combination with an endless traveling bag-carrier having sections or plates provided with a transverse dovetail groove and bag-supporting pins arranged adjacently, of a locking-bar adapted to enter and traverse said groove, needles arranged parallel to the locking-bar and adapted to traverse the section, and means for operating the said locking device and needles simultaneously, substantially as shown and described.

32. In a machine of the character described, the combination with an endless traveling bag-carrier composed of a series of sections or plates hinged together and carrying bag-holding pins, as specified, of means for locking the carrier as a whole, and a device for locking an individual section thereon, and needles arranged alongside such device and adapted to coact with the pins of the section when thus locked, substantially as shown and described.

33. In a machine of the character described, the combination with string-inserting devices and a movable bag-carrier, of means for moving the same as a whole and locking the moving agent, and means for locking an individual section thereof preparatory to the action of the bag-stringing mechanism, substantially as shown and described.

34. In a machine of the character described, the combination with an endless traveling bag-carrier comprising a series of sections hinged together and provided with a transverse groove, and bag-holding pins arranged adjacent to said groove, a locking-bar adapted to enter the groove, needles arranged parallel to said bar, and a common head to which the bar and needles are rigidly attached, and a means for imparting due reciprocation to both devices, substantially as shown and described.

35. In a machine of the character described, the combination with the frame having horizontal runways as specified, of an endless traveling bag-carrier supported in said runways, a bracket extending laterally from the said frame and provided with a guideway as specified, of a locking device and needles rigidly connected and means for reciprocating them on the said bracket and across the bag-carrier, substantially as shown and described.

36. In a machine of the character described, the combination with the endless traveling bag-carrier composed of flat plates or sections which are jointed together and each provided with a lengthwise dovetail groove, and a locking device, of a piece 21 which is slidable in said groove and carries a bag-holding pin, means for moving said piece automatically as the bag-carrier advances, fixed pins on said plates or sections, and means for moving the bag-carrier intermittently, substantially as shown and described.

JAMES W. TAYLOR.

Witnesses:
SOLON C. KEMON,
J. MIDDLETON.